(12) United States Patent
Shearer

(10) Patent No.: US 11,222,187 B1
(45) Date of Patent: Jan. 11, 2022

(54) SCANNER, SYSTEM, AND METHOD FOR A SCANNER IMAGING ILLUMINATION FILTER

(71) Applicant: NCR Corporation, Atlanta, GA (US)

(72) Inventor: Frank Shearer, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/915,024

(22) Filed: Jun. 29, 2020

(51) Int. Cl.
    *G06K 7/10*     (2006.01)
    *G06K 9/78*     (2006.01)
    *G06Q 20/20*    (2012.01)

(52) U.S. Cl.
    CPC ........... *G06K 7/10732* (2013.01); *G06K 9/78* (2013.01); *G06Q 20/208* (2013.01)

(58) Field of Classification Search
CPC ..... G06K 7/10732; G06K 9/78; G06Q 20/208
See application file for complete search history.

(56) References Cited

U.S. PATENT DOCUMENTS

2013/0128223 A1* 5/2013 Wood ................. A61B 1/00186
                                                                            351/206

* cited by examiner

*Primary Examiner* — Matthew Mikels
(74) *Attorney, Agent, or Firm* — Schwegman Lundberg & Woessner

(57) ABSTRACT

A scanner is provided having an integrated or retrofitted amber filter placed in front of white illumination LEDs. When an object/item is placed within a field of view of a lens of the scanner, the white illumination LEDs are illuminated and pass through the amber filter, which filters out light in the light spectrum of approximately 340-500 nm. The object/item is illuminated with light approximately above 500 nm and reflected back through a portion of the lens that covers an imaging sensor resulting in an object/item image in the light spectrum approximately above 500 nm, which improves the user experience by removing the glaring blue light component of the white LEDs illumination while not impacting the performance of the object/item recognition when processed for a transaction being conducted at a transaction terminal that is interfaced to the scanner.

11 Claims, 4 Drawing Sheets

SCANNER, SYSTEM, AND METHOD FOR A SCANNER IMAGING ILLUMINATION FILTER

BACKGROUND

Complementary Metal Oxide Semiconductor (CMOS)-based barcode engines have switched from using red Light Emitting Diodes (LEDs) to broad spectrum white LEDs for illumination. These white LEDs have a significant blue light component that was absent in the red LEDs. The blue light makes these white LEDs appear uncomfortably bright.

This change from red illumination LEDs to white illumination LEDs emitting from a barcode engine, per the imager Original Equipment Manufacturer (OEM), was made because some operators and/or customers were concerned their eyes were being damaged by the red light. These operators and consumers equated the red LED illumination with eye damaging red LASER illumination and therefore considered the red light dangerous.

The white LEDs solved the operator's/customer's perceived eye damage issues while at the same time improved the barcode recognition of the barcode readers, because the red LEDs reduced overall illumination captured for the barcode images. Yet, the blue light component introduced with the white LEDs actually caused eye discomfort and can be so bright that even individuals adjacent to the transaction terminals also experience uncomfortable brightness illuminating from the barcode reader.

The traditional red filters for red illumination, both LASER and LED, tend to reduce overall illumination of white LEDS, which an interfere with optimal barcode image capture by barcode readers.

SUMMARY

In various embodiments, a scanner, a system, and a method a scanner imaging illumination filter are presented.

According to an embodiment, a method for operating a scanner with an imaging illumination filter is presented. Specifically, and in one embodiment, LEDs of a scanner are illuminated to illuminate an object placed in a field of view of a lens of the scanner with light in a first spectrum. The light is filtered with a filter during the illumination causing the object to be illuminated with filtered light in a second spectrum. An imaging sensor of the scanner captures an object image of the object as reflected filtered light in the second spectrum.

DETAILED DESCRIPTION

Figure 1A:
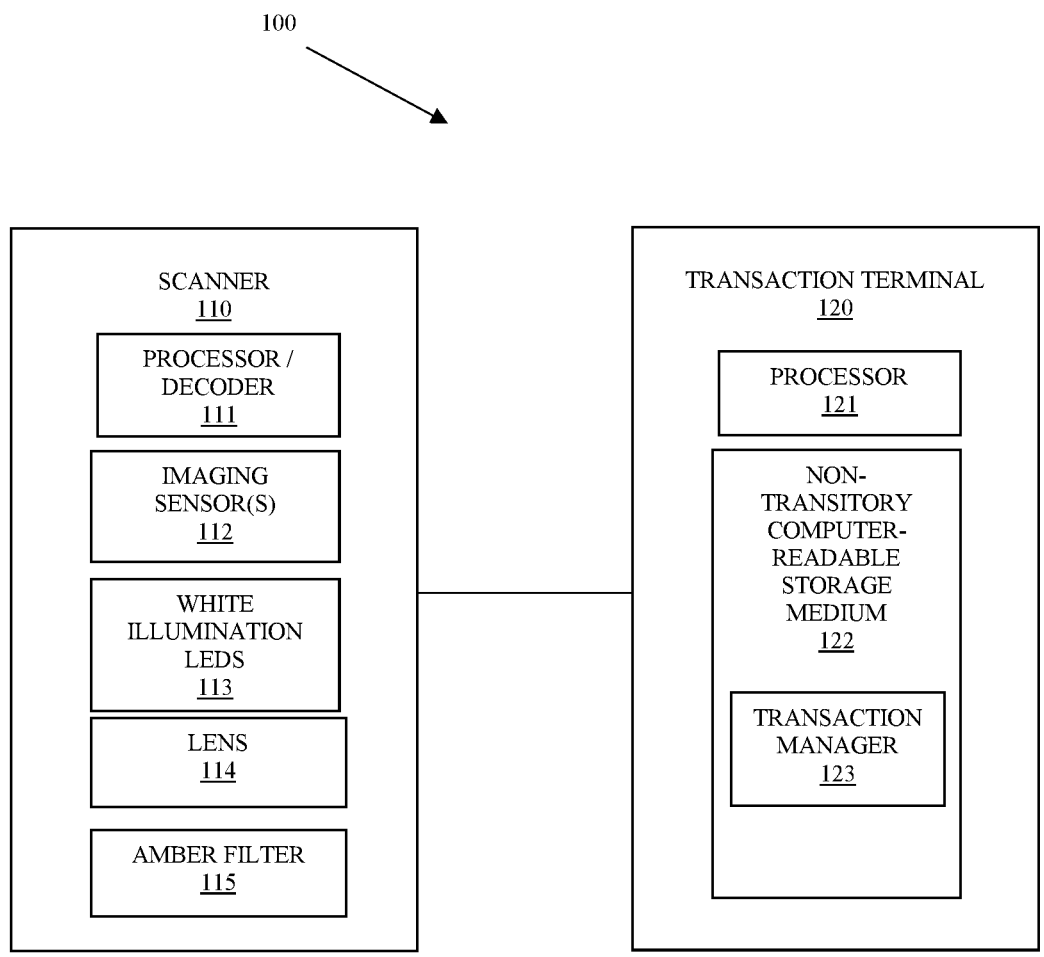
FIG. 1A is a diagram of a scanner and a system for item an imaging illumination filter, according to an example embodiment.

FIG. 1A is a diagram of a scanner and a system for item an imaging illumination filter, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of scanner imaging illumination filtering, presented herein and below.

The system 100 includes: a scanner 110 and a transaction terminal 120. The scanner 110 comprises a processor/decoder 111, one or more imaging sensors 112, white illumination LEDs 113, a lens 114, and an amber filter 115. The transaction terminal 120 comprises a processor 121, a non-transitory computer-readable storage medium 122 having executable instructions representing a transaction manager 123.

White illumination LEDs 113 flood an area in front of the lens 114 with light. An object/item is illuminated with the light and the imaging sensors 112 capture an image of the illuminated object/item flooded in the white LEDs 113. Processor/Decoder 111 processes the image captured by the imagining sensors 112 and decodes any barcode found. If the decoded symbology has been enabled in the processor/decoder 111 it is transmitted to transaction terminal 120.

During operation, transaction manager 123 receives an image of the object/item from scanner 110 and decodes the barcode, looks up the item information, and price details and processes a transaction be performed on terminal 120. The quality of the barcoded image is dependent upon how the item is illuminated (type of light) and captured by imaging sensors 112.

Conventionally, the illumination lights are either red LED or white LEDs. The White LEDs 113 include a blue light spectrum between 340-500 nanometers (nm), which can impact the overall quality of the item image captured by imaging sensors 112 and which can irritate the eyes of the operator because the emitted white LEDs 113 are bright and uncomfortable to the eyes. Imaging sensors 112 capture light in the spectrum greater than 500 nm to greater than 540 nm, so the blue light spectrum of 340-500 provides no significant benefit to the overall quality of the captured image.

By placing an amber filter 115 over the portion of the lens 114 where the white LEDs 113 are illuminated through, the user is not subjected to a substantial portion of the light spectrum from 340-500 nm (blue light) because the object/item is illuminated in filtered light comprising a spectrum of greater than approximately 500 nm. Essentially, the blue light spectrum (340-500 nm) is blocked from exiting the lens 114 that covers white LEDs 113 resulting in an illumination having a light spectrum of greater than 100 nm. This improves the user experience while not impacting the quality of the image captured by imaging sensors 112 and improves barcode recognition and decoding performed by transaction manager 123 and/or performed on the scanner 110 by scanner processor 111 (it is noted that processor 111 may include software or firmware that decodes the captured image and sends the encoded information to transaction manager 123).

Figure 1B:
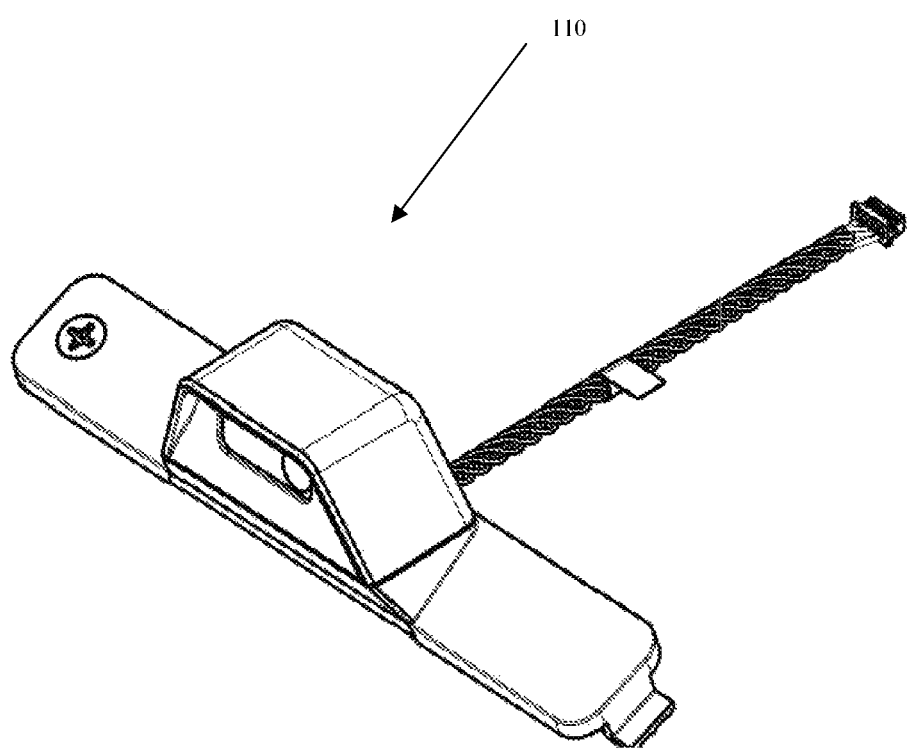
FIG. 1B is a diagram of a scanner having an imaging illumination filter, according to an example embodiment.

FIG. 1B is a diagram of an example scanner 110 having the imaging illumination filter 115, according to an example embodiment.

Scanner 110 is an example of one scanner having amber filter 115. The scanner 110 is a cube scanner. It is noted that any scanner may be used and/or modified to include the amber filter 115 that blocks the blue light spectrum (340-500 nm) of the white illumination LEDs 113, such that the illumination projected by scanner 110 is only in the light spectrum of approximately greater than 500 nm.

Figure 1C:
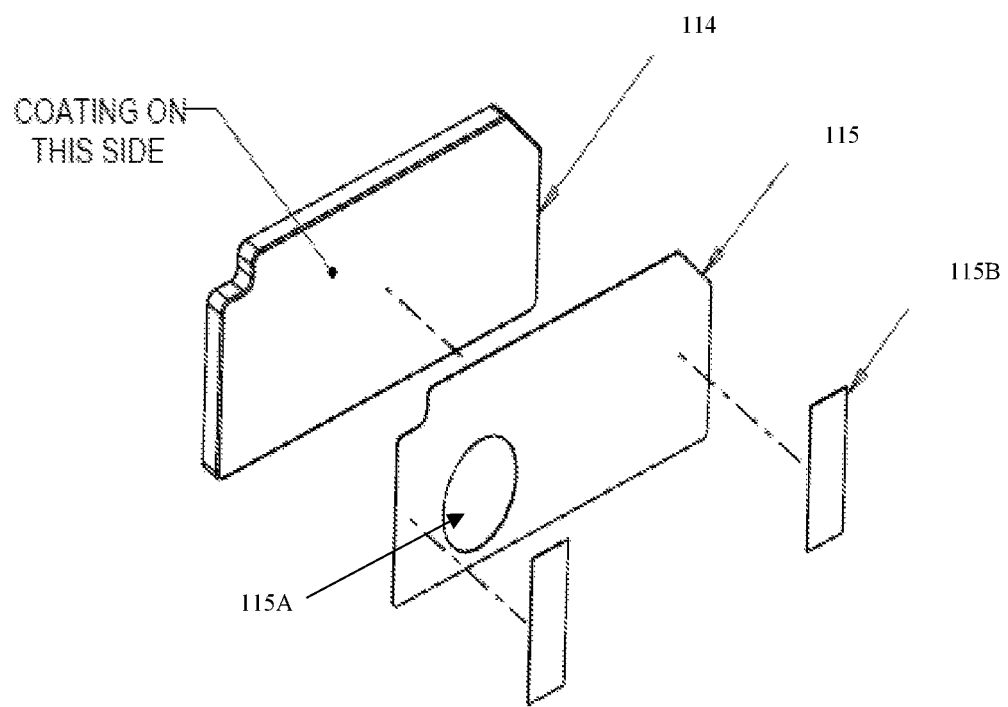
FIG. 1C is a diagram of components of the scanner in the FIG. 1B relevant to the imaging illumination filter, according to an example embodiment.

FIG. 1C is a diagram of components of the scanner 110 in the FIG. 1B relevant to the imaging illumination filter 115, according to an example embodiment.

Lens 114 comprises an area from which the white LEDs 113 are situated behind and through which the white LEDs 113 emit the white light to illuminate an object/item placed in field-of-view of imaging sensors 112.

Filter 115 is an amber filter that blocks light in the spectrum associated with blue light, which is approximately 340-500 nm. Filter 115 also includes an aperture 115A (circle) representing an area associated with the imaging sensor 112 that is directly situated behind lens 114.

Filter 115 further, and optionally, comprises two strips of adhesive 115B, which allows filter 115 to be adhered between lens 114 and imaging sensor 112. It is noted that other mechanisms may be used to situate filter 115 between lens 114 and imaging sensor 112.

Further, filter 115 is cut to correspond to the shape, size, dimensions, and configuration as lens 114 within scanner 110. This allows integration of filter 115 into an existing scanner creating a modified novel scanner 110 having filter 115 interposed between lens 114 and the corresponding imaging sensor 112.

In an embodiment, scanner 110 is a scanner manufactured with the amber filter 115.

In an embodiment, scanner 110 is a scanner manufactured with a slot between the lens 114 and the imaging sensor 112 for inserting and removing amber filter 115 and for inserting and removing other filters.

Again, and in an embodiment, scanner 110 is an existing scanner retrofitted after manufacture with the amber filter 115 interposed between lens 114 and imaging sensors 112.

Aperture 115A permits the light reflected back from the filtered blue-light that was filtered when the white LEDs 113 illuminated the object/item to enter directly through lens 114 into imaging sensor 112. That is, because the white LEDs 113 are filtered when illuminated, there is no need to further filter the reflected light from the object/item in the location of the lens 114 where the reflected light enters the imaging sensor 112.

In an embodiment, the white LEDs 113 are situated behind lens 114, in such a configuration the amber filter 115 may be configured and sized to fit over that portion of the lens 114 that is in front of the white LEDs 113 only, in which case there is no aperture 115A required for imagining sensors 112. So, the amber filter 115 may be placed only in front of the emitted light from white LEDs 113 or placed across the entire lens 114 with an aperture 115A in front of imagining sensors 112 depending on scanner 110 configuration and/or type.

In an embodiment, transaction terminal 120 is a Self-Service Terminal (SST) interfaced over a wired connection or a wireless connection, a Point-Of-Sale (POS) terminal interfaced over a wired connection or a wireless connection, a tablet computer interfaced wirelessly to scanner 110, or a phone interfaced wireless to scanner 110.

In an embodiment, scanner 110 is a cube scanner as illustrated in FIG. 1B.

In an embodiment, scanner 110 is a bioptic scanner.

In an embodiment, scanner 110 is any scanner used as a barcode reader to a transaction terminal 120 having the integrated amber filter 115 and the white illumination LEDs 113.

These and other embodiments are now discussed with FIG. 2 below.

Figure 2:
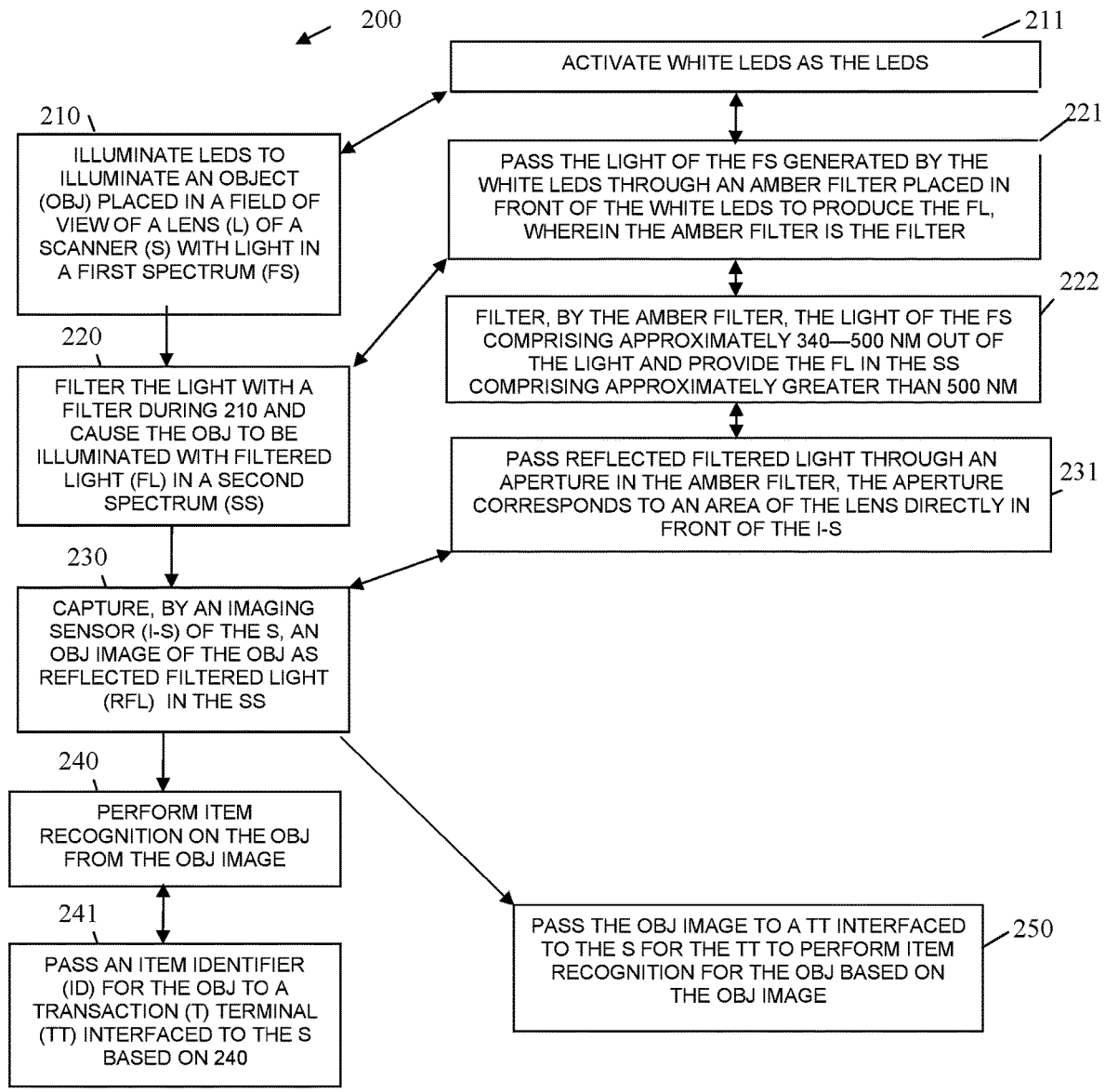
FIG. 2 is a diagram of a method for operating a scanner with an imaging illumination filter, according to an example embodiment.

FIG. 2 is a diagram of a method 200 for operating a scanner 110 with an amber filter 115 for item recognition, according to an example embodiment. The method comprises electromechanical and mechanical components along with software or firmware components to implement the method 200 ("scanner controller"). The software components of the scanner controller are implemented as executable instructions programmed and residing within memory and/or a non-transitory computer-readable (processor-readable) storage medium and executed by one or more processors of a scanner. The processor(s) of the scanner that executes the the software components of the scanner controller are specifically configured and programmed to process the software components of the scanner controller. The software components of the scanner controller have access to one or more network connections during its processing. The network connections can be wired, wireless, or a combination of wired and wireless.

In an embodiment, the device that executes the software components of the scanner controller and the device that includes the electromechanical and mechanical components is scanner 110. In an embodiment, scanner 110 is a portable wireless scanner. In an embodiment, scanner 110 is a cube scanner. In an embodiment, scanner 110 is a bioptic scanner.

In an embodiment, the software components of the scanner controller are configured as executable instructions or firmware residing in a non-transitory computer-readable storage medium of scanner 110. The executable instructions when executed by processor 111 of scanner 110 performs the processing discussed herein and below for the scanner controller.

At 210, the scanner controller illuminates LEDs to illuminate an object placed in a field of view of a lens of a scanner with light in a first spectrum.

In an embodiment, at 211, the scanner controller illuminates or activates white LEDs as the LEDs.

At 220, the scanner controller filters the light with a filter during the illuminating and causing the object to be illuminated with filtered light in a second spectrum.

In an embodiment of 211 and 220, at 221, the scanner controller passes the light of the first spectrum generated by the white LEDs through an amber filter placed in front of the white LEDs to produce the filtered light, wherein the amber filter is the filter.

In an embodiment of 221 and at 222, the scanner controller filters, by the amber filter, the light of the first spectrum comprising approximately 340-500 nm out of the light and providing the filtered light in the second spectrum comprising approximately greater than 500 nm.

At 230, the scanner controller captures, by an imaging sensor of the scanner, an object image of the object as reflected filtered light in the second spectrum.

In an embodiment of 222 and 230, at 231, the scanner controller passes reflected filtered light through an aperture in the amber filter, wherein the aperture corresponds to an area of the lens directly in front of the imagining sensor.

In an embodiment, at 240, the scanner controller performs item recognition on the object from the object image.

In an embodiment of 240 and at 241, the scanner controller passes an item identifier for the object to a transaction terminal 120 interfaced to the scanner based on 240.

In an embodiment, at 250, the scanner controller passes the object image to a transaction terminal 120 interfaced to the scanner for the transaction terminal to perform item recognition for the object based on the object image.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A scanner, comprising:
white illumination Light Emitting Diodes (LEDS);
a lens;
at least one imaging sensor;
an amber filter placed in front of the white illumination LEDS to cause white light illuminated on an object in a first spectrum of light to be filtered into a second spectrum of the light that is substantially devoid of blue light that was originally included with the first spectrum;
wherein reflected light from the object in the second spectrum is passed through the lens and captured by the at least one imaging sensor as an object image for the object; and
a processor configured to pass the object image to a transaction terminal interfaced to the scanner during a transaction at the transaction terminal, wherein the transaction terminal performs object recognition on the object image for the transaction.

2. A scanner, comprising:
white illumination Light Emitting Diodes (LEDS);
a lens;
at least one imaging sensor;
an amber filter placed in front of the white illumination LEDS to cause white light illuminated on an object in a first spectrum of light to be filtered into a second spectrum of the light that is substantially devoid of blue light that was originally included with the first spectrum;
wherein reflected light from the object in the second spectrum is passed through the lens and captured by the at least one imaging sensor as an object image for the object; and
a processor configured to perform object recognition on the object image and pass an object identifier for a transaction to a transaction terminal interfaced to the scanner.

3. The scanner of claim 1, wherein the first spectrum comprises light of greater than 340 nanometers (nm).

4. The scanner of claim 3, wherein the second spectrum comprises light of greater than 500 nm.

5. The scanner of claim 1, wherein the white illumination LEDs are situated behind a first portion of the lens.

6. The scanner of claim 5, wherein the at least one imaging sensor is situated behind a second portion of the lens.

7. The scanner of claim 6, wherein the amber filter is situated between the first portion of the lens and the at least one imaging sensor.

8. The scanner of claim 7, wherein the amber filter comprises an aperture that corresponds to the second portion of the lens.

9. The scanner of claim 1, wherein the amber filter is integrated into an existing scanner between the lens and the at least one imaging sensor.

10. The scanner of claim 2, wherein the white illumination LEDS are situated behind a first portion of the lens.

11. The scanner of claim 2, wherein the first spectrum comprises light of greater than 340 nanometers (nm) and the second spectrum comprises light of greater than 500 nm.

* * * * *